United States Patent
Tamagawa et al.

(10) Patent No.: US 6,859,693 B2
(45) Date of Patent: Feb. 22, 2005

(54) TORQUE VARIATION CONTROL DEVICE AND COMPUTER PROGRAM

(75) Inventors: Yutaka Tamagawa, Saitama (JP); Hiroyuki Makino, Saitama (JP); Yoshihiro Katagiri, Saitama (JP); Tomoyuki Takano, Saitama (JP); Atsushi Matsubara, Saitama (JP); Shinichi Kitajima, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/394,174

(22) Filed: Mar. 24, 2003

(65) Prior Publication Data

US 2003/0177846 A1 Sep. 25, 2003

(30) Foreign Application Priority Data

Mar. 25, 2002 (JP) ........................ 2002-082941

(51) Int. Cl.[7] ............................................. F16H 61/06
(52) U.S. Cl. ...................... 701/22; 701/41; 180/247; 180/408; 180/446; 477/34; 73/862.29
(58) Field of Search ........................... 701/22, 41, 89; 180/247, 248, 197, 408, 446, 65.2; 477/34, 77, 109; 73/862.29, 862.191, 862.9; 280/12.13; 318/632, 432, 629

(56) References Cited

U.S. PATENT DOCUMENTS

| 5,040,629 | A | * | 8/1991 | Matsuoka et al. | ........ 180/446 |
|---|---|---|---|---|---|
| 5,699,249 | A | * | 12/1997 | Noro et al. | ............ 701/42 |
| 5,708,343 | A | * | 1/1998 | Hara et al. | .......... 318/599 |
| 6,094,613 | A | * | 7/2000 | Ochi et al. | ............ 701/66 |
| 6,326,753 | B1 | * | 12/2001 | Someya et al. | ......... 318/471 |
| 6,381,525 | B1 | * | 4/2002 | Hori et al. | ............ 701/41 |
| 6,505,139 | B1 | * | 1/2003 | Koga et al. | ........... 702/148 |
| 6,564,136 | B2 | * | 5/2003 | Asumi et al. | ............ 701/70 |
| 6,564,139 | B2 | * | 5/2003 | Sakakiyama | ............ 701/89 |
| 2002/0117858 | A1 | * | 8/2002 | Hanyu et al. | .......... 290/4 C |
| 2002/0149332 | A1 | * | 10/2002 | Inagaki et al. | .......... 318/432 |
| 2003/0069675 | A1 | * | 4/2003 | Kifuku et al. | ............ 701/41 |
| 2004/0038776 | A1 | * | 2/2004 | Kuhstrebe et al. | ........ 477/77 |

FOREIGN PATENT DOCUMENTS

| JP | 61-06127 | 3/1986 | |
| JP | 61-061923 | 3/1986 | |
| JP | 61-061925 | 3/1986 | |
| JP | 2000-282910 | 10/2000 | |
| JP | 2001-028809 | 1/2001 | |
| JP | 2001-057714 | 2/2001 | |
| JP | 3323976 B2 | * 9/2002 | ........ B06K/41/04 |

* cited by examiner

Primary Examiner—Thomas G. Black
Assistant Examiner—Tuan C To
(74) Attorney, Agent, or Firm—Westerman, Hattori, Daniels & Adrian, LLP

(57) ABSTRACT

A torque variation control device for a vehicle which has a motor providing rotational torque to a drive shaft of a vehicle, a motor control means controlling the motor based on drive torque, and a rotational velocity detection means detecting a rotational velocity of the drive shaft or a rotational shaft of the motor. The device has a feature that the device includes a torque variation detection means detecting a torque variation of the vehicle caused by a variation of the rotational velocity, and a compensation torque setting means setting compensation torque in an opposite phase relative to the torque variation.

12 Claims, 9 Drawing Sheets

FIG.1A

ENGINE/MOTOR SIDE

FIG.1B

VIBRATION OF ROTATIONAL VELOCITY OF ENGINE

ROTATIONAL VELOCITY OF ENGINE

START OF ACCELERATION

TIME →

FIG.9A
(WITH A DEVICE)

FIG.9B
(WITHOUT A DEVICE)

TORQUE VARIATION CONTROL DEVICE AND COMPUTER PROGRAM

FIELD OF THE INVENTION

The present invention relates to a torque variation control device and a computer program therefor for restraining torque vibration generated during acceleration or deceleration of a vehicle, such as an electric vehicle driven by a motor and a hybrid vehicle driven by a motor and engine.

BACKGROUND OF THE INVENTION

It has been observed that a vehicle with manual transmission (MT) experiences a vibration back and forth when sudden acceleration or deceleration is exerted on the vehicle. This phenomenon is explained in the following manner. The traction wheels of vehicle cannot respond to a sudden variation of engine torque, thereby causing a torsional vibration for a drive line transmitting torque from an engine to the traction wheels, specifically a drive shaft (drive axis). This torsional vibration causes a vibration of rotational velocity of the engine, developing a vibration in the driving force of vehicle.

Figure 1A:
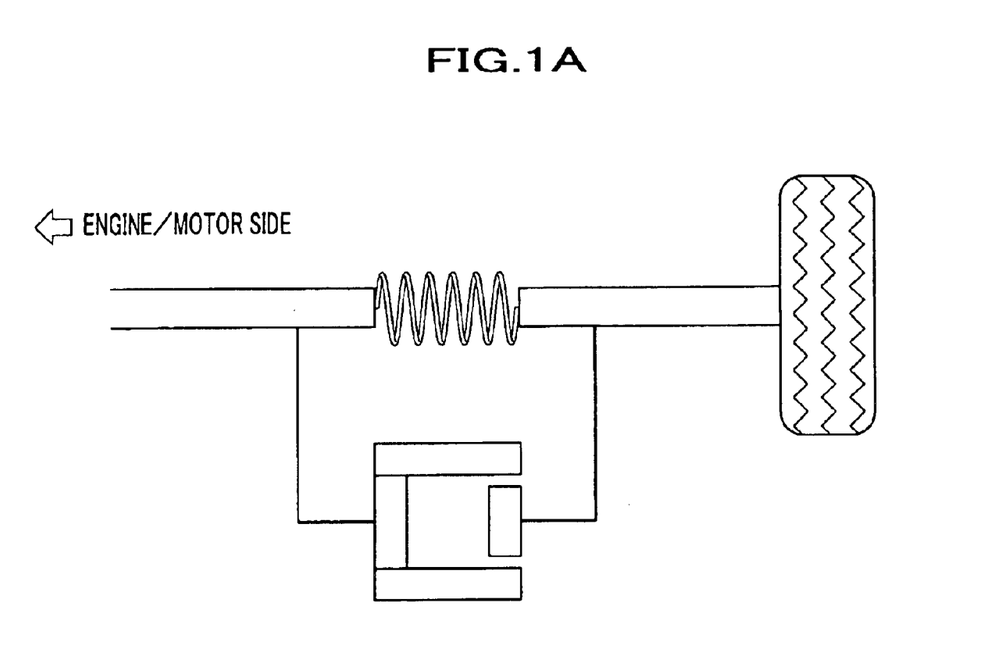
FIG. 1A is a conceptual diagram showing a physical model of drive shaft.

As shown in FIG. 1A, a drive shaft is modeled by a combination of spring and damper in parallel. If the drive shaft twists as a result of a sudden variation of engine torque, it stars a torsional vibration with spring effect. The amplitude of this torsional vibration becomes smaller with the passing of time by damper effect. Therefore, a model of simple harmonic motion, the amplitude of which gradually attenuates, is representative of the torsional vibration of drive shaft.

Figure 1B:
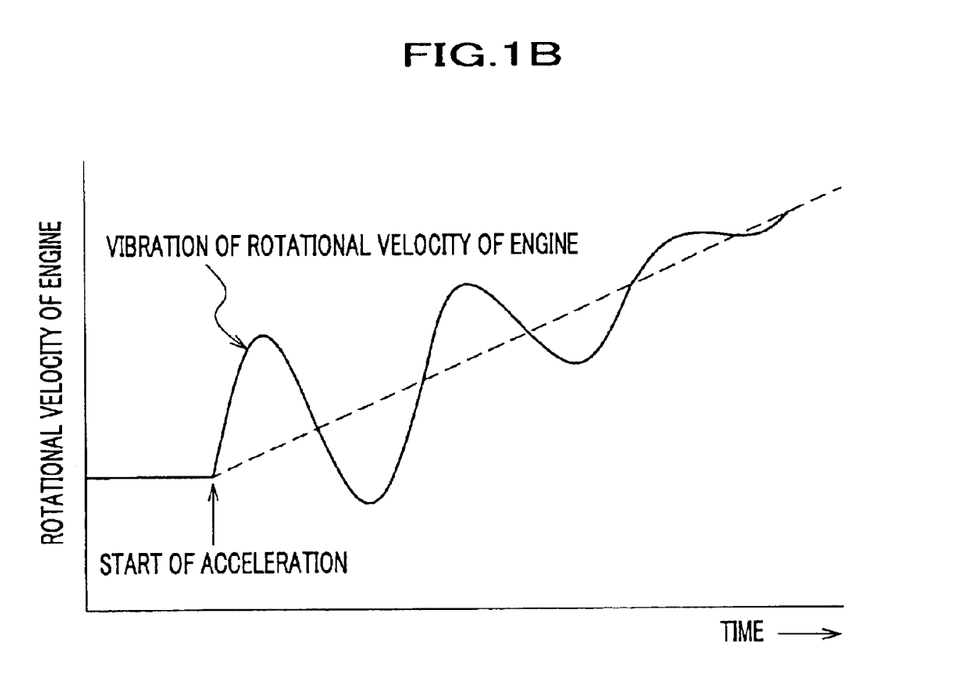
FIG. 1B is also a conceptual diagram showing a torsional vibration of drive shaft caused by vehicular acceleration or deceleration.

The torsional vibration (torque variation) of a drive shaft caused by acceleration or deceleration of a vehicle will be described referring to FIG. 1B. In FIG. 1B, the vertical axis represents the rotational velocity of an engine which has an effect on the torsional vibration of a drive shaft and the horizontal axis represents time. When the acceleration of vehicle is suddenly started from the condition of constant rotational velocity of engine, the rotational velocity of engine should linearly increase along the broken line shown in the figure on the condition that a torsional vibration of drive shaft does not occur. However, actually the rotational velocity of engine increases in a vibratory manner as the torsional vibration of drive shaft occurs. Occupants of the vehicle feel this vibration of rotational velocity of engine as a torque variation, which makes them feel swinging back and forth and experience some uncomfortable feeling accordingly. This phenomenon also occurs in a vehicle driven by a motor.

In order to solve the problem, such a method as delaying the response of an engine to an accelerator pedal by delaying the ignition timing of engine so as to decrease the engine power while the accelerator pedal is depressed has been generally practiced. However, the method has not yet solved the risk that the performance of vehicular acceleration is sacrificed.

This problem also occurs in a hybrid vehicle having an engine and a motor as driving means. Japanese Published Patent Application 2001-57714 discloses a method aiming at solving of the problem for such a type of vehicle. When a command for a sudden torque variation is generated, the command is not directly transmitted to a drive line but undergoes a delay process, and thereby the torque is gradually varied and the vibration of a drive shaft is restricted. However, this method has not solved the problem that the performance of vehicular acceleration is degraded as a result of the poorer response of motor to the command for torque variation.

Further, the invention disclosed in Japanese Published Patent Application 2001-28809 is named, which is an improvement of Japanese Published Patent Application 2001-57714.

When a command for torque variation of a motor is generated, the torque actually powered by the motor, which is estimated with an inverse model based upon a rotational velocity of motor, is defined as estimated torque. Control torque for controlling a torque vibration is then computed based upon the difference between this estimated torque and that requested by the command. The summation of the control torque and that requested by the command is subsequently delivered to the motor. However, this method has difficulty in achieving highly accurate control of output torque of the engine for a hybrid vehicle employing an engine and electric motor in parallel. In this way, an error in engine torque is added to the estimated torque, thereby resulting in the generation of an inappropriate compensation torque.

SUMMARY OF THE INVENTION

The present invention provides a torque variation control device and computer program for a hybrid vehicle, which possibly experiences a sudden variation of torque. The device and computer program are capable of restricting vibration acting back and forth on the vehicle by converging the torque variation rapidly.

An object of the present invention is to provide a torque variation control device for a vehicle which has a motor providing rotational torque to a drive shaft of the vehicle, a motor control means controlling the motor based on drive torque, and a rotational velocity detection means detecting a rotational velocity of the drive shaft or a rotational shaft of the motor. The device has a feature that the device includes a torque variation detection means detecting a torque variation of the vehicle caused by a variation of the rotational velocity, and a compensation torque setting means setting compensation torque in an opposite phase relative to the torque variation.

According to the present invention, the rotational velocity detection means monitors the rotational velocity of the drive shaft or the rotational shaft of motor. The torque variation detection means judges if a torque variation like simple harmonic motion exists in the rotational velocity detected by the rotational velocity detection means. If the torque variation like simple harmonic motion is detected, the compensation torque setting means determines a compensation torque with opposite phase relative to the torque variation, and the motor control means controls the motor taking into account the compensation torque, thereby canceling the torque variation like simple harmonic motion.

In this connection, a motor having twofold functions, electric motor and generator, may be selected. Serving as an electric motor, the motor is able to provide drive torque to the drive shaft. The motor can also serves as a generator that performs regenerative motion for charging a battery while driven by the drive shaft.

Another object of the present invention is to provide a device which has a feature that the torque variation detection means includes a first differential computation means computing a first differential of the rotational velocity and a second differential computation means computing a second differential of the rotational velocity. Further, the torque variation detection means judges that there occurs a torque variation if the first differential is less than or equal to a first predetermined value and the second differential is equal to or greater than zero. Also the compensation torque setting means sets positive compensation torque and the motor control means compensates the drive torque of motor with the positive compensation torque.

According to the present invention, the torque detection means has the first differential computation means for computing a first differential of the rotational velocity of motor and the second differential computation means for computing a second differential of the rotational velocity of motor.

Figure 2A:
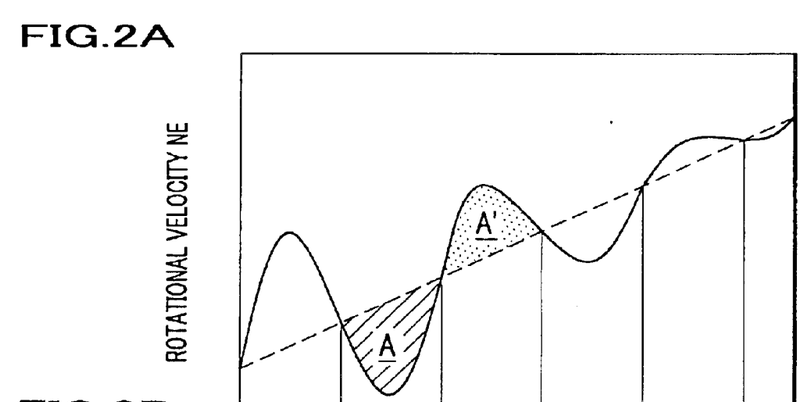
FIG. 2A to FIG. 2C are conceptual diagrams showing a rotational velocity, a first differential of the velocity and a second differential of the velocity vs. time respectively while acceleration is commanded for a motor.

FIG. 2A shows a conceptual history of the rotational velocity of motor while a vehicle is being accelerated. It is assumed that the motor, which serves as an electric motor while supplied electricity by the battery, provides drive torque to the drive shaft.

In FIG. 2A, the horizontal axis represents time and the vertical axis represents the rotational speed of a motor. Drive torque powered by the motor is intrinsically linear as shown in the figure with a broken line. However, the actual rotational velocity generated by the motor gradually increases with a torque variation like simple harmonic motion caused by the torsional vibration of drive shaft described before.

Figure 2B:
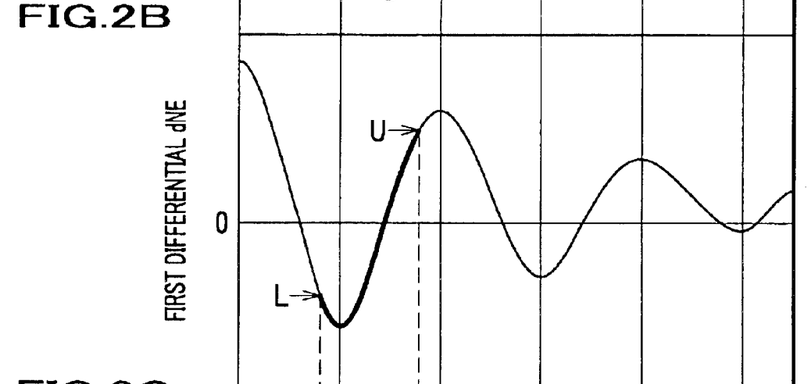

A first differential of the rotational velocity of motor is shown in FIG. 2B. The first differentiation eliminates a constant, extracting a component of torque variation of motor which vibrates around zero. The component has a larger value as the amplitude of vibration of rotational velocity of motor increases. Compared with the rotational velocity of motor in FIG. 2A, the first differential is relatively offset by the phase of 90 deg. and also represented by simple harmonic motion, the amplitude of which attenuates with the passing of time.

Figure 2C:
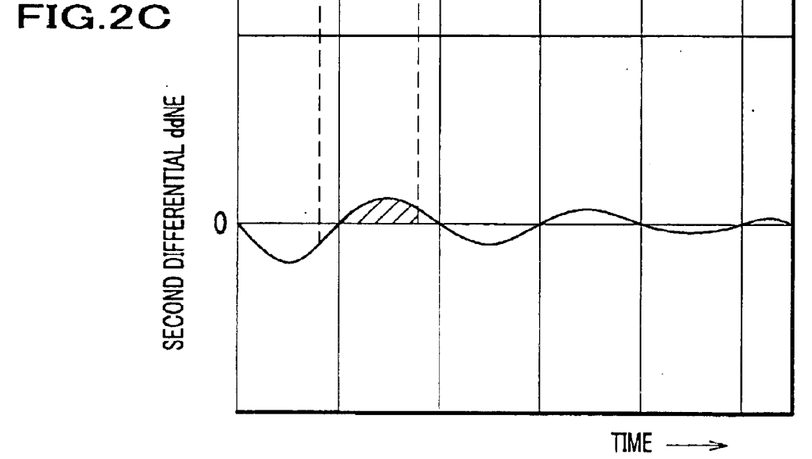

A second differential of the rotational velocity of motor is shown in FIG. 2C. The second differentiation of the rotational velocity of motor creates an oscillating curve around zero, which is offset by the phase of 180 deg. relative to the rotational velocity. Accordingly, it is shown in FIGS. 2A and 2C that a time of occurrence of a bottom in FIG. 2A is synchronized with that of a peak in FIG. 2C and vice versa.

In an area A shown in FIG. 2A, it is interpreted that the actual drive torque (output power) of a motor relatively falls short of that required (broken line) during vehicular acceleration. The torque variation control device according to the present invention provides positive compensation torque to the motor in this area A to compensate a relative shortage of drive torque, thereby canceling a torque variation and restricting a vibration of the rotational velocity of motor (torque variation).

More specifically, in an exemplary embodiment, the torque variation detection means judges that a torque variation like simple harmonic motion, the amplitude of which is larger than a given value, occurs if a first differential is less than or equal to a predetermined value L (FIG. 2B) and a second differential is equal to or greater than zero.

Receiving the results of judgment, the compensation torque setting means computes positive compensation torque, multiplying a second differential (hatching area in FIG. 2C) by a predetermined gain. The motor control means subsequently makes an addition of the positive compensation torque and a torque command for motor and delivers the result of addition to the motor. Until a first differential reaches a predetermined value U, the compensation torque setting means continues computing positive compensation torque for each sampling time based upon a second differential and delivering the torque to the motor.

In this way, the compensation torque setting means delivers positive compensation torque only when a rotational velocity falls in the area A, thereby compensating a relative shortage of drive torque. It leads to cancellation of a torque variation like simple harmonic motion, thereby eliminating subsequent torque variations. This feature of the present invention especially benefits a vehicle during acceleration.

In this connection, the positive compensation torque described above refers to one which increases the rotational velocity of a drive shaft.

Still another object of the present invention is to provide a device, which has a feature that the torque variation detection means includes a first differential computation means computing a first differential of the rotational velocity; and a second differential computation means computing a second differential of the rotational velocity. Further, the torque variation detection means judges that there occurs a torque variation if the first differential is equal to or greater than a second predetermined value and the second differential is less than or equal to zero. Also the compensation torque setting means sets negative compensation torque and the motor control means compensates the drive torque of motor with the negative compensation torque.

This feature of the present invention especially benefits a vehicle during deceleration.

Figure 3A:
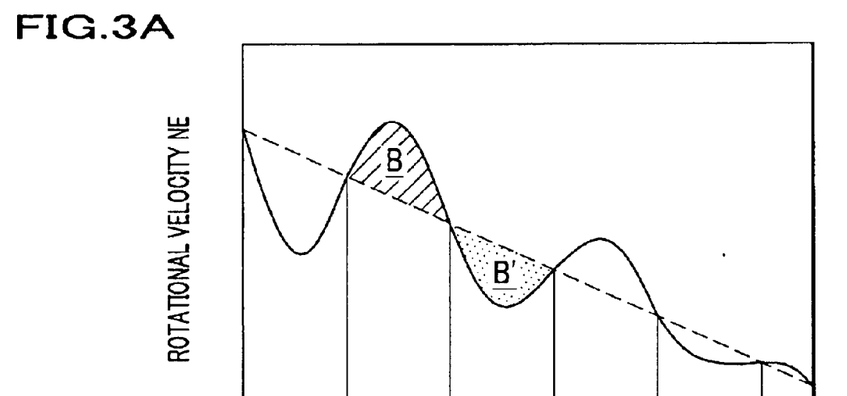
FIG. 3A to FIG. 3C are conceptual diagrams showing a rotational velocity, a first differential of the velocity and a second differential of the velocity vs. time respectively while deceleration is commanded for a motor.
Figure 3B:
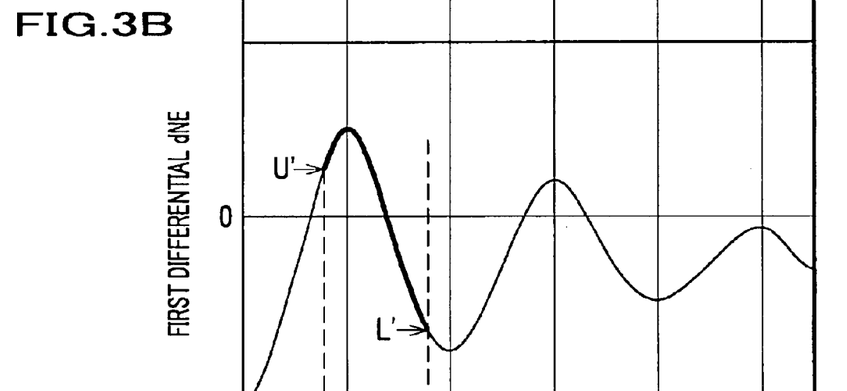
Figure 3C:
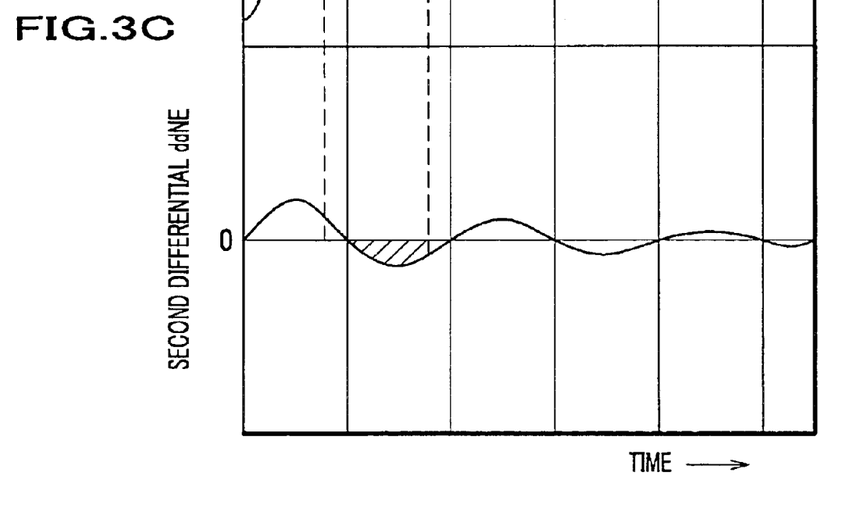

FIGS. 3A, 3B and 3C are figures showing a history of the rotational velocity of a motor, another history of the first differential and the other history of the second differential during vehicular deceleration, respectively.

The motor serves as a generator while driven by the drive shaft, charging the battery.

In an area B shown in FIG. 3A, it is interpreted that the actual drive torque of a motor relatively exceeds that required (broken line) during vehicular deceleration. The torque variation control device according to the present invention provides negative compensation torque to a motor in this area B to compensate a relative excess of drive torque, thereby canceling a torque variation and restricting subsequent vibrations of the rotational velocity of motor (torque variations).

More specifically, in an exemplary embodiment, the torque variation detection means judges that a torque variation like simple harmonic motion, the amplitude of which is larger than a given value, occurs if a first differential is equal to or greater than a predetermined value U' and a second differential is less than or equal to zero.

Receiving the results of judgment, the compensation torque setting means computes negative compensation torque, multiplying a second differential (hatching area in FIG. 3C) by a predetermined gain. The motor control means subsequently makes an addition of the negative compensation torque and a torque command for motor and delivers the result of addition to the motor. Until a first differential reaches a predetermined value L', the compensation torque setting means continues computing negative compensation torque for each sampling time based upon a second differential and delivering the torque to the motor.

In this way, the compensation torque setting means delivers negative compensation torque only when a rotational velocity falls in the area B, thereby compensating a relative excess of drive torque. It leads to cancellation of the torque variation like simple harmonic motion, thereby eliminating subsequent torque variations.

In this connection, the negative compensation torque described above refers to one which decreases the rotational velocity of a drive shaft.

Yet another object of the present invention is to provide a torque variation control device, wherein if the drive torque of motor reaches an upper limit when the motor control means compensates the drive torque of motor with the positive compensation torque, the motor is driven based upon the upper limit of drive torque.

Description will be made for a case where the drive torque of a motor exceeds the upper limit when the compensation torque setting means delivers positive compensation torque to the motor.

In this case the compensation torque setting means controls the positive compensation torque so as not to exceed the upper limit of drive torque of motor. The means thus protects a battery for driving the motor and a power drive unit (PDU) against oversupply of electricity.

In case the motor control means cannot optimally control a torque variation like single harmonic motion due to restriction of the upper limit of positive compensation torque, the means performs subsequent control by commanding negative compensation torque for the motor. The amplitude and duration of negative compensation torque are determined in the same manner as those described before.

According to the present invention, even if the drive torque of motor reaches the upper limit, the motor control means can control a torque variation like single harmonic motion by commanding negative compensation torque for a motor.

A further object of the present invention is to provide a torque variation control device, wherein if the drive torque of motor reaches an upper limit when the motor control means compensates the drive torque of motor with the negative compensation torque, the motor is driven based upon the upper limit of drive torque.

A description will be made for a case where the drive torque of a motor exceeds the upper limit when the compensation torque setting means commands negative compensation torque for the motor.

In this case, the compensation drive setting means controls the negative compensation torque so as not to exceed the upper limit of drive torque of motor. The means thus protects a battery for driving the motor and PDU against oversupply of electricity.

In case the motor control means cannot optimally control the torque variation like single harmonic motion due to restriction of the upper limit of negative compensation torque, the means performs subsequent control by commanding positive compensation torque for the motor. The amplitude and duration of positive compensation torque are determined in the same manner as those described before.

According to the present invention, even if a drive torque of motor reaches the upper limit, the motor control means can control a torque variation like single harmonic motion by commanding positive compensation torque for a motor.

A still further object of the present invention is to provide a torque variation control device, wherein a vehicle has an engine coupled to a drive shaft and a lag of ignition timing of an engine is increased when a torque variation is detected.

This aspect of the present invention relates to a hybrid vehicle driven by an engine and motor. When the torque variation does not converge even if the motor control means commands positive compensation torque for the motor, another measure is adopted for controlling the torque variation, which employs delaying of the ignition timing of engine so as to lower the response of engine to a command of acceleration.

In this way, if a torque variation like single harmonic motion cannot be eliminated by the control with positive compensation torque described before, the torque variation can be controlled by increasing the lag of engine response for a hybrid vehicle.

A yet further object of the present invention is to provide a torque variation control device, wherein compensation torque is determined by multiplying a second differential of multiplicand by a predetermined gain of multiplier.

According to this aspect of the present invention, the compensation torque is computed by multiplying the second differential by the predetermined gain. As shown in FIGS. 1A–1C and 2A–2C, since a second differential of rotational velocity of motor is offset by the phase of 180 deg. relative to a rotational velocity of motor, the compensation torque can be easily computed by multiplying the second differential by the gain (positive value).

Another object of the present invention is to provide a torque variation control device, wherein the second differential computation means computes a second differential from a first differential which passes through a low pass filter and a resultant delay is compensated by advancing the second differential a predetermined amount.

According to this aspect of the present invention, the second differential is computed from the first differential which comes through the low pass filter. Since only the component of torque variation is thus sampled by elimination of high-frequency noise component from the second differential, the timing of delivering the compensation torque to a motor and amplitude thereof can be set appropriately.

The second differential has a phase lag relative to the first differential as the low pass filter introduces a delay. In this aspect of the present invention, the phase lag is cancelled by introducing a predetermined advance into the second differential. This makes a direct comparison between the first and second differentials feasible, thereby enabling accurate determination of timing of delivering the compensation torque.

Still another object of the present invention is to provide a torque variation control device, wherein the upper limit of motor drive torque is controlled based upon at least one of battery and inverter temperatures.

According to this aspect of the present invention, the upper limit of drive torque of motor described before is controlled based upon at least one of battery and inverter temperatures. Therefore, a torque variation can be controlled efficiently depending on performance of battery and/or inverter under low or high temperature condition where the performance is likely to degrade.

Yet another object of the present invention is to provide a computer program for controlling torque variation of a vehicle, which executes an onboard computer of the vehicle having a motor for generating drive power in a process including computation of a first differential, computation of a second differential, determination of compensation torque and determination of timing.

According to this aspect of the present invention, the computer program enables the execution of processes required by a torque variation control device. In this way, the compensation torque setting means determines compensation torque, which is to be added to drive torque of motor, based upon a second differential of a rotational velocity of rotational shaft of vehicle. Since the timing setting means then adds the compensation torque to the drive torque of motor based upon first and/or second differential with an appropriate timing, a torque variation like simple harmonic motion can be efficiently controlled during vehicular acceleration or deceleration.

DESCRIPTION OF THE PREFERRED EMBODIMENTS

Figure 4:
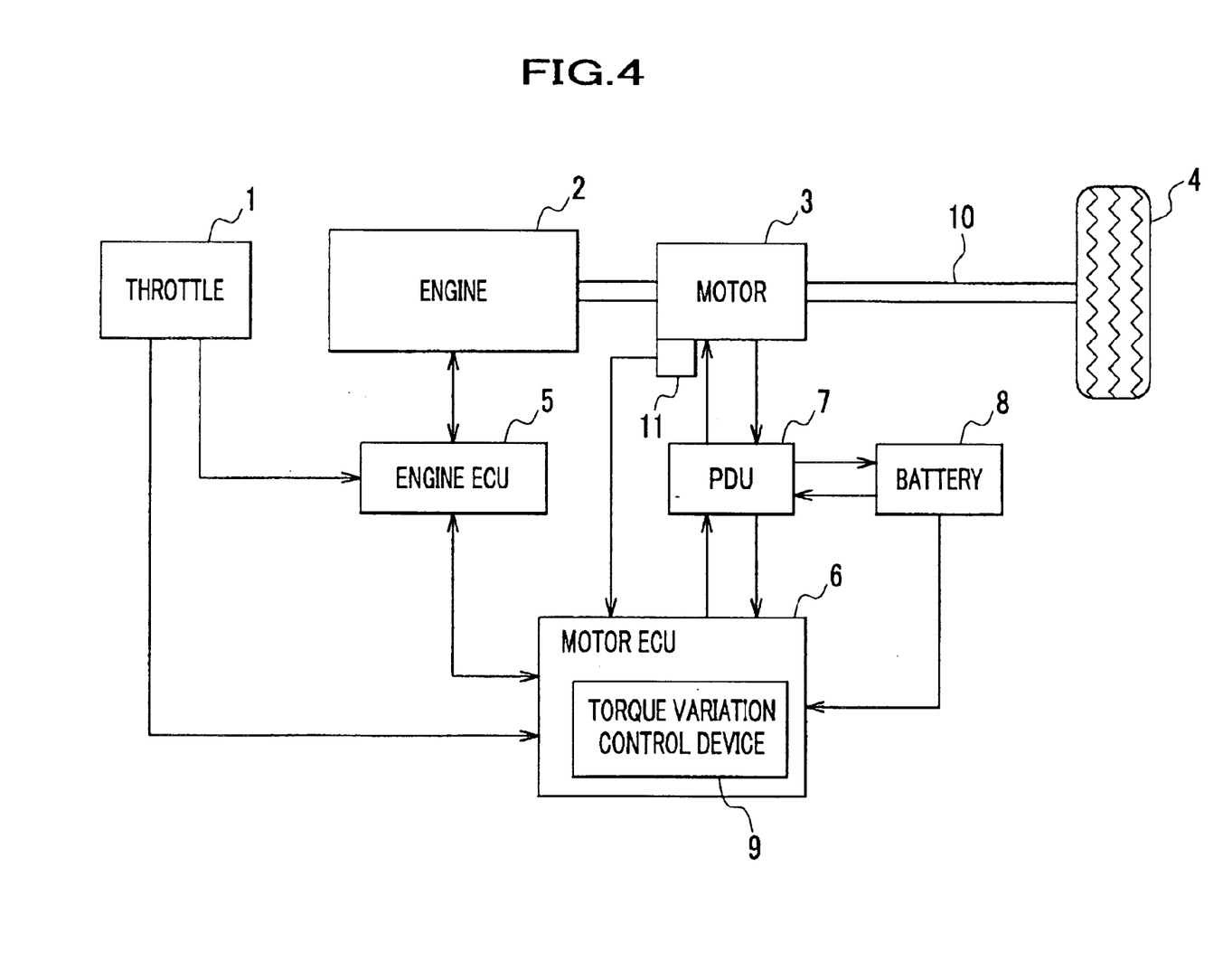
FIG. 4 is a functional block diagram showing a vehicle to which a torque variation control device according to the present invention is applied.

An embodiment of the present invention will now be described with reference to the accompanying drawings. FIG. 4 is a functional block diagram showing a hybrid vehicle to which a torque variation control device according to the present invention is applied.

A hybrid vehicle to which the present invention is applied includes a throttle 1, an engine 2, a motor 3, traction wheels 4, a power drive unit (PDU) 7, a battery 8, an engine electric control unit (ECU) 5, and a motor ECU 6. A torque variation control device 9 according to the present invention is located in the motor ECU 6. Also a clutch and manual transmission (not shown) are placed after the motor 3. On the other hand, in the case of vehicles having a torque converter or a continuously variable transmission (CVT) with an automatic clutch, a torque variation tends to be absorbed by the torque converter or clutch and thereby a driver feels less torque variation compared with the case of a hybrid vehicle of the present embodiment.

In the hybrid vehicle, the engine 2, motor 3 and traction wheels 4 are directly coupled through a drive shaft 10. There is the other type having a transmission between the engine 2 and motor 3 but the vehicle exemplified in this embodiment employs direct coupling. Motor 3 plays versatile roles, starting the engine 2, assisting the output power of engine 2 or generating electricity driven by the power of engine 2 depending on the vehicular driving conditions, and generating electricity with generative energy obtained by generative movement during vehicular braking. Motor 3 is a generator-motor, which serves not only as a motor but also as a generator. Engine 2 is an internal combustion engine, which makes combustion with a mixture of fuel such as gasoline and air breathed through the throttle 1, transmits drive force to the drive shaft 10.

PDU 7 including an inverter and the like drives the motor 3 which receives the electricity supplied by the battery 8 during assist mode, in which the motor 3 assists the engine 2. On the other hand, during regenerative mode, PDU 7 charges the battery 8 receiving the electricity generated by the motor 3. In this connection, the inverter, which is a pulse width modulation (PWM) inverter, includes a bridge circuit (not shown) made of a plurality of switching elements in bridge connection.

Battery (high voltage battery) 8, which is used for driving of the motor 3 and charging of regenerative electricity, is a stacked battery made of several nickel hydrogen cells. When the motor 3 is driven by the electricity stored in the battery 8, the electricity is supplied from the battery 8 to motor 3 through PDU 7 controlled by the motor ECU 6 (discharge). On the other hand, when the motor 3 generates electricity, the generated electricity is stored in the battery 8 through PDU 7 controlled by the motor ECU 6.

Engine ECU 5 serves as a controller for the engine 2, controlling an amount of fuel supplied to the engine 2 and ignition timing thereof based on the angle of throttle 1. Further, the engine ECU 5 continuously monitors a load acting on the engine 2 and sends a torque command compatible with the load to the motor ECU 6. The torque command includes a signal for commanding a torque output of the motor 3. Motor 3 basically serves as a generator or an electric motor based upon this torque command. The torque command refers to "drive torque" in the appended claims.

Motor ECU 6, in which the torque variation control device 9 according to the present invention is located, generates an updated torque command by adding a compensation torque command computed by the device 9 to the torque command described above. Motor ECU 6 in this way serves as a controller controlling the motor 3 through PDU 7 based on this updated torque command. The compensation torque command refers to "compensation torque" in the appended claims.

Motor ECU 6 receives a signal of rotational velocity of the drive shaft 10 from a rotational velocity sensor 11 mounted on the motor 3. This rotational velocity is then used in the torque variation control device 9 in order to compute a compensation torque command.

Similarly, the signals of temperature of battery 8 and PDU 7, which are sent to the motor ECU 6, are used for determining a limit of output power (discharge) of the battery 8. An upper limit of torque command for the motor 3 is then determined based upon this limit of discharge.

Figure 5:
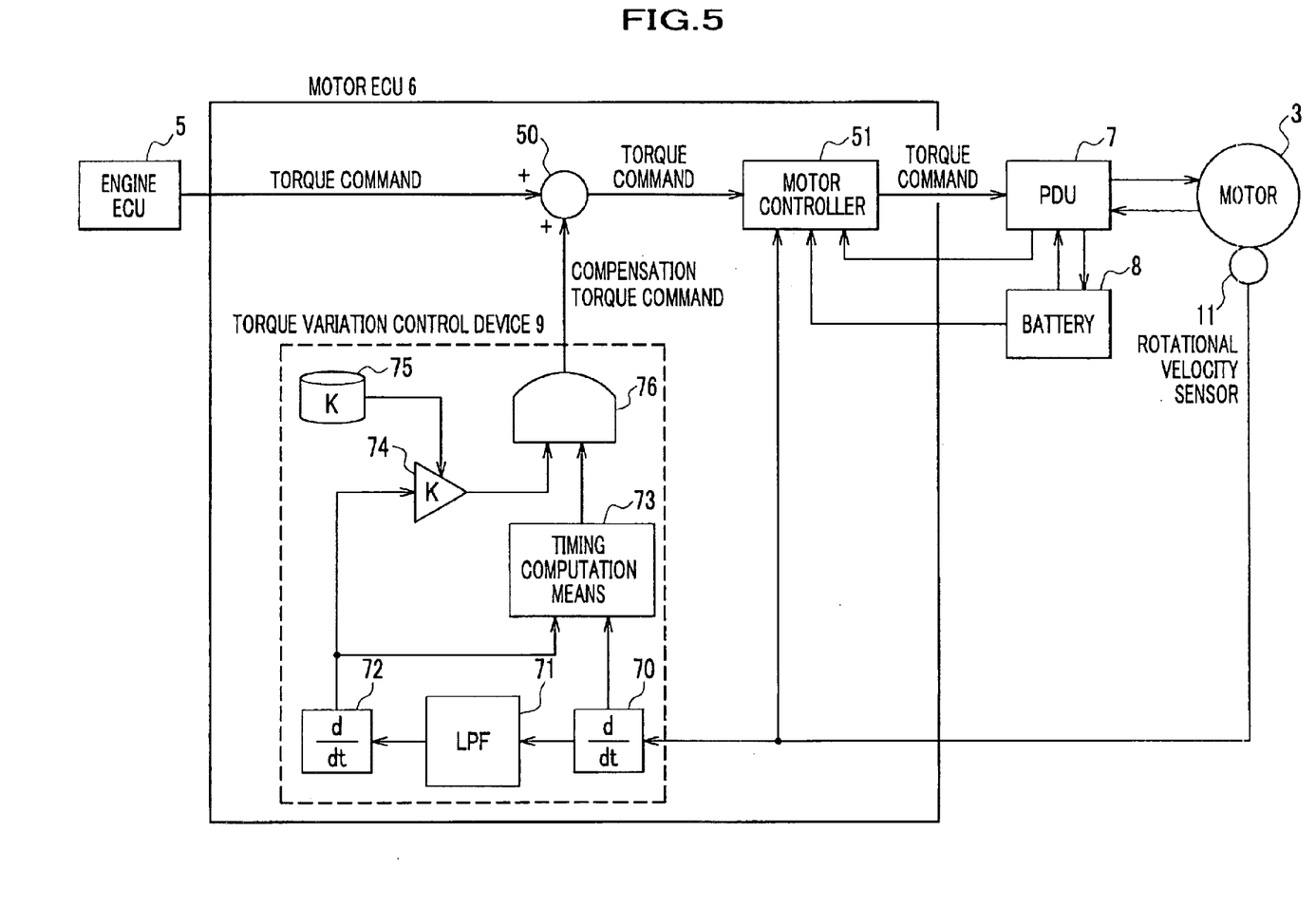
FIG. 5 is a functional block diagram showing a torque variation control device according to the present invention.

FIG. 5 is a functional block diagram showing a drive control block for the motor 3 including the torque variation control device 9 according to the present invention.

Motor ECU 6 includes the torque variation control device 9, an adder 50 and a motor controller 51.

The torque variation control device 9 receives a signal of rotational velocity of the drive shaft 10 from the rotational velocity sensor 11 mounted on the motor 3. The device 9 makes computations to be described later, and generates amplitude and timing of compensation torque command so that a torque variation like simple harmonic motion during vehicular acceleration or deceleration can be eliminated.

Adder 50 is for making summation of a compensation torque command delivered by the torque variation control device 9 and a torque command delivered by the engine ECU 5. Adder 50 makes summation of both commands and generates an updated torque command, which is sent to the motor controller 51.

Motor controller 51 controls the motor 3 based upon the torque command delivered by the adder 50.

The upper limit of electricity supplied by the battery 8 for driving the motor 3 (upper limit of torque command for the motor 3) and the other upper limit of electricity of the battery 8 charged by the motor 3 (upper limit of torque command for the motor 3) are both controlled based upon the temperatures of PDU 7 and battery 8. Motor controller 51, which receives the signals of temperature of PDU 7 and battery 8, controls a torque command so as not to exceed the upper limit determined for the temperature conditions.

Description is now made for the torque variation control device 9.

Torque variation control device 9 includes a first differential computation device 70, a low pass filter (hereinafter referred to as LPF) 71, a second differential computation device 72, a timing computation device 73, a gain multiplier 74, a gain memory 75 and a multiplier 76.

A rotational velocity of the drive shaft 10 detected by the rotational velocity sensor 11 enters the first differential computation device 70, in which a first differential of rotational velocity is computed. The first differential, from which high frequency noise is eliminated by LPF 71, enters the second differential computation device 72 where a second differential thereof is computed.

A given phase delay is introduced into the second differential as it is computed from the first differential which is processed by LPF 71. This phase delay is cancelled by giving a predetermined advance to the second differential.

The computed second differential then enters the gain multiplier 74 where a compensation torque command is computed by multiplying the second differential by a gain K, a predetermined constant. Gain K is determined in advance depending on driving conditions of vehicle and stored in the gain memory 75.

Gain multiplier 74, which continuously evaluates a compensation torque command, does not deliver every command to the motor 3 but delivers a compensation torque command in order to cancel the torque variation only when a torque variation like simple harmonic motion occurs during vehicular acceleration or deceleration. The output timing of compensation torque command is determined by the timing computation device 73.

First and second differentials continuously enter the timing computation device 73. Timing computation device 73 judges whether a vehicle is under acceleration or deceleration based upon the first differential and whether or not a torque variation like single harmonic motion occurs based upon the magnitude of first and second differentials.

When the timing computation device 73 detects a torque variation like simple harmonic motion, the device 73 generates "1" and otherwise "0".

Multiplier 76 executes multiplication of an output of the timing computation device 73 and a compensation torque command generated by the gain multiplier 74, and then sends the product thereof to the adder 50.

When a torque variation like simple harmonic motion does not occur, the timing computation device 73 generates "0", by which the multiplier 76 sends the product of 0 to the adder 50. In this way, a torque command which the adder 50 sends to the motor controller 51 does not include a compensation torque command.

On the other hand, when a torque variation like simple harmonic motion occurs, the timing computation device 73 generates "1", by which the multiplier 76 sends a compensation torque command to the adder 50. In this way, a torque command which the adder 50 delivers to the motor controller 51 includes this compensation torque command.

"Torque variation detection means" in the appended claims includes the first differential computation device 70, LPF 71, the second differential computation device 72 and the timing computation device 73. Also "compensation torque setting means", in the appended claims includes the second differential computation device 72, the gain multiplier 74 and the gain memory 75.

Figure 6:
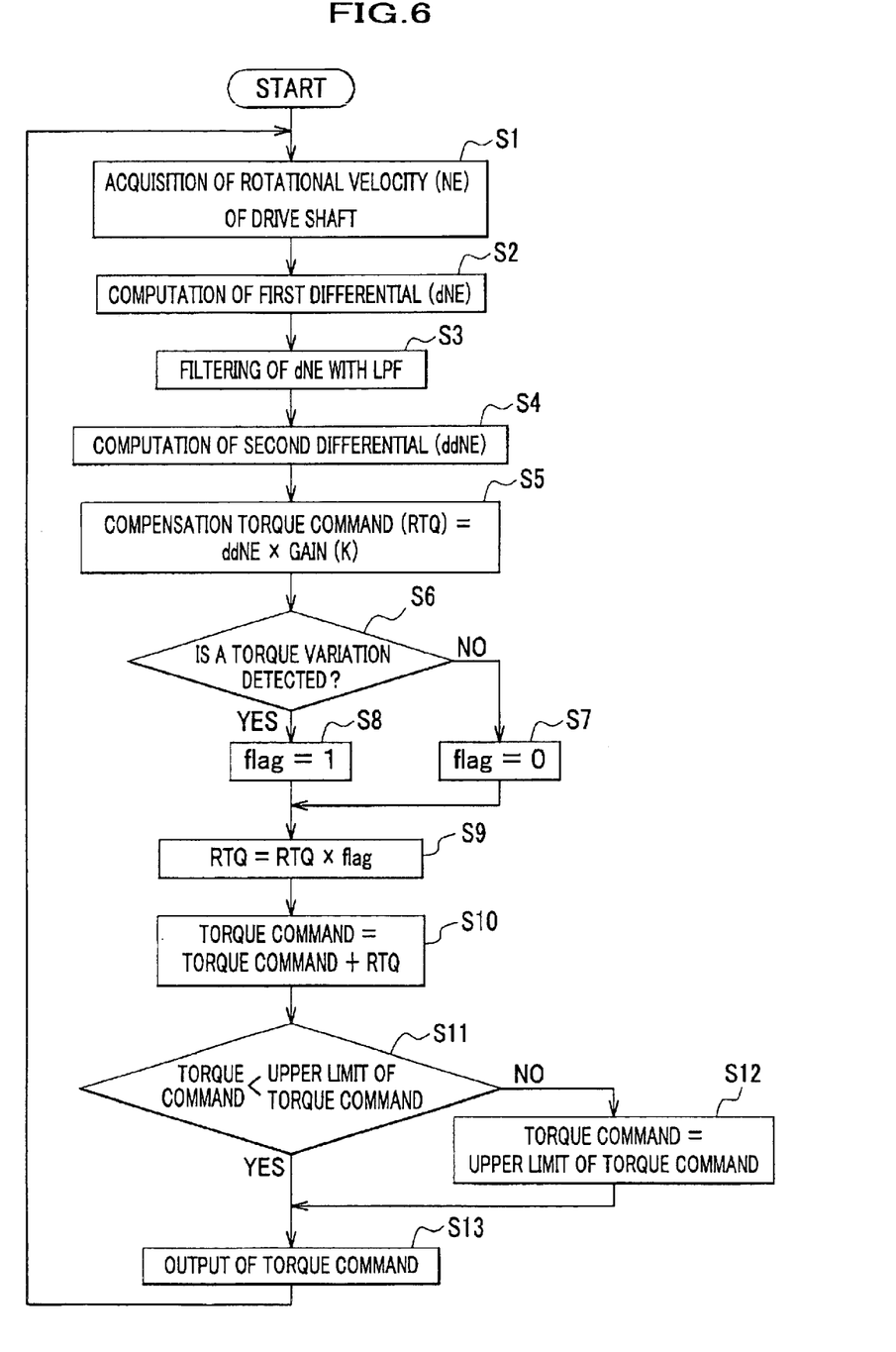
FIG. 6 is a flow diagram showing a process performed by a torque variation control device according to the present invention.
Figure 7:
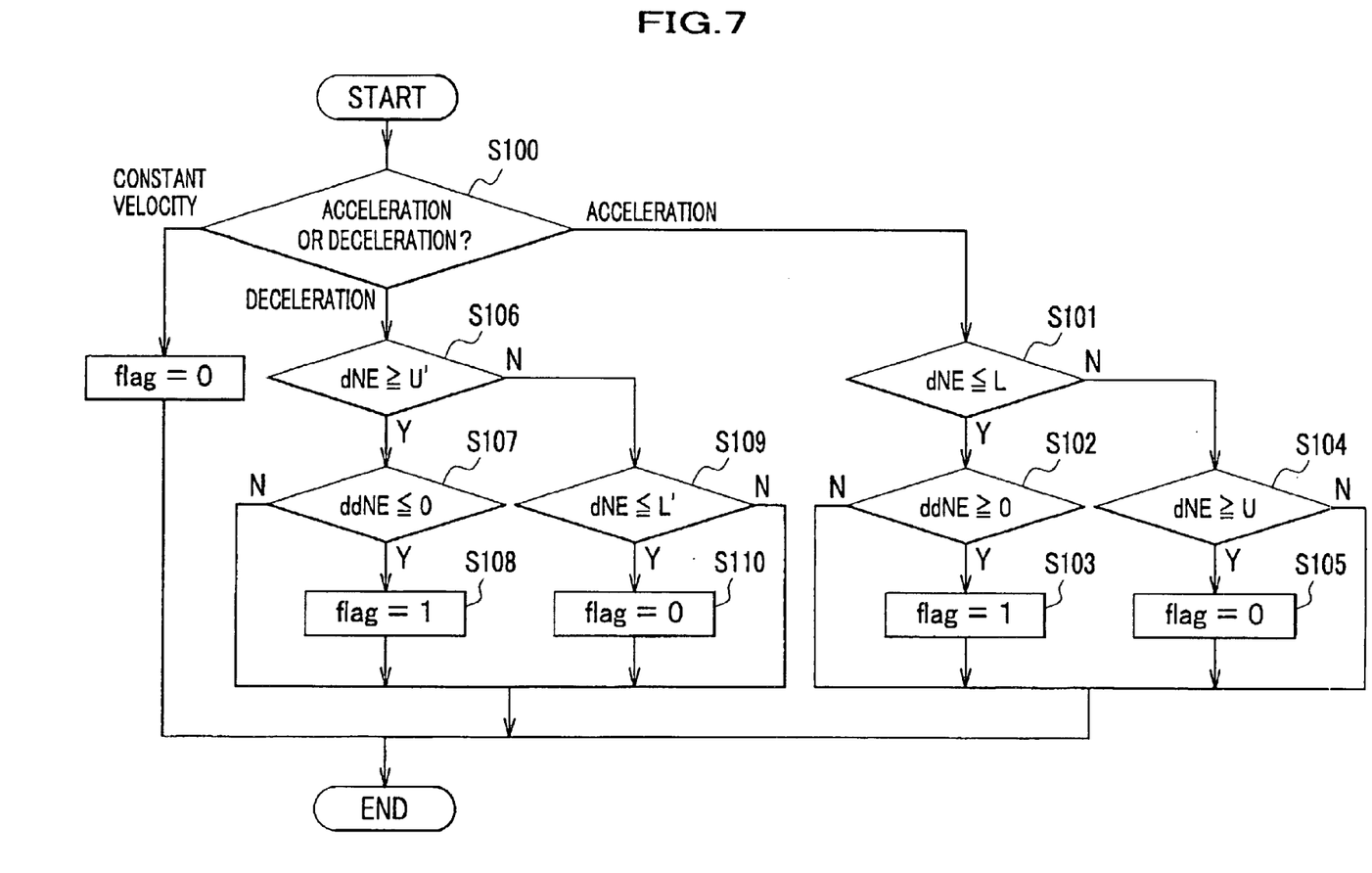
FIG. 7 is a flow diagram showing a flow of detection of a torque variation like simple harmonic motion performed by timing computation means.

Next, steps for the torque variation control are described referring to flow diagrams shown in FIGS. 6 and 7.

FIG. 6 is a flow diagram showing a process performed by a torque variation control device 9 according to the present invention.

First at step S1 a rotational velocity NE of the drive shaft 10 which is detected by the rotational velocity sensor 11 mounted on the motor 3 enters the torque variation control device 9 shown in FIG. 5.

This rotational velocity NE is differentiated with regard to time to result in a first differential dNE (step S2). This first differential dNE is then processed by LPF 71 and thereby a component of high frequency noise is eliminated (step S3). The first differential dNE, from which the noise component is eliminated at step S3, is differentiated with regard to time by the second differential device 72 and then given a predetermined advance so that the delay introduced by LPF 71 can be compensated. In this way, a second differential ddNE is obtained (step S4).

The second differential ddNE is then sent to the gain multiplier 74 and multiplied by a gain K stored in the gain memory 75, thereby resulting in a compensation torque command RTQ (step S5).

When a rotational velocity of the drive shaft 10 falls in an area A (FIG. 2A), which indicates that a torque command for the rotation of drive shaft 10 is relatively insufficient, a positive compensation torque command for assisting the rotation of drive shaft 10 is computed by multiplying a second differential (hatching area in FIG. 2C) by a predetermined gain K.

On the other hand, when a rotational velocity of the drive shaft 10 falls in an area B (FIG. 3A), which indicates that a torque command for the rotation of drive shaft 10 is relatively excessive, a negative compensation torque command for decelerating the rotation of drive shaft 10 is computed by multiplying a second differential (hatching area in FIG. 3C) by a predetermined gain K.

In parallel with step S5, the timing computation device 73 monitors whether or not a torque variation like simple harmonic motion occurs at the drive shall 10 (step S6). If the timing computation device 73 judges that a torque variation does not occur (NO) at step S6, the device 73 sets "0" for a flag (step S7). On the other band, if the timing computation device 73 judges that a torque variation occurs (YES), the device 73 sets "1" for a flag (step S8). The details of torque detection at step S6 will be described later.

Subsequently at step S9, the multiplier 76 makes a computation with an expression (1):

$$RTQ = RTQ \times \text{flag} \qquad (1)$$

where RTQ is a compensation torque command.

Only when "1" is set for a flag as a result of detection of a torque variation at step S6, a compensation torque command RTQ has a value other than 0.

At step S10, the adder 50 makes a computation with an expression (2) so that a torque command for exerting the rotation of motor 3 is obtained.

$$\text{torque command} = \text{torque command} + \text{compensation torque command } (RTQ) \qquad (2)$$

A torque command obtained at step S10 is then sent to the motor controller 51. Motor controller 51, which controls the upper limit of torque command for the motor 3 based upon the temperatures of battery 8 and PDU 7, judges whether or not the torque command exceeds the upper limit.

If the torque command is not less than the upper limit (NO), the motor controller 51 forcibly sets the torque command to be equal to the upper limit so that the battery 8 and PDU 7 can be protected (step S12).

For a case where the torque command is set to be equal to the upper limit at step S12, details of restriction of torque variation like simple harmonic motion is described. For example, when a torque command is not sufficient in the area A shown in FIG. 2A, a positive compensation torque command RTQ for encouraging the rotation of drive shaft 10 should be exerted in order to restrict a torque variation like simple harmonic motion.

When a compensated torque command with the expression (2) described above exceeds the upper limit of torque command for the motor 3 as a result of addition of a positive compensation torque command RTQ to a torque command, the compensated torque command will be cut off to the upper limit at step S12. In this case, a torque variation like simple harmonic motion cannot be sufficiently restricted in the area A (FIG. 2A), carried to the subsequent period to appear as an area A' (FIG. 2A).

Since a torque command is excessive in the area A', a negative compensation torque command RTQ for reducing the torque command for drive shaft 10 should be selected so that a torque variation in the area A' and thereafter can be restricted. In the area A', a compensation torque command RTQ which reduces the torque command for drive shaft 10, different from that in the area A, is added to the torque command. Thus, the compensated torque command for motor 3 will not exceed the upper limit, so that the torque variation can be securely converged in the area A'.

The similar description as that described above is applied to a case shown in FIGS. 3A, 3B and 3C. Even if a torque variation cannot be restricted in the area B, the torque variation can be controlled in the area B' by exerting a compensation torque command opposite to that in the area B.

Finally, the motor controller 51 sends a torque command to the motor 3 via PDU 7 (step S13).

After step S13 the flow returns to step S1, and steps S1 through S13 are repeated.

Let's assume a case which is not explicitly described in the flow diagrams FIGS. 6 and 7. When a torque variation like simple harmonic motion cannot be converged accidentally during vehicular acceleration shown in FIGS. 2A, 2B and 2C, the torque variation may be restricted by an alternative method. It introduces a delay for the ignition timing of engine 2, by which the response of engine 2 is decreased and gradual acceleration is attained so that the torque variation can be restricted.

A flow for detecting a torque variation like simple harmonic motion performed by the timing computation device 73 at steps S6 through S8 is now described referring to FIG. 7, FIGS. 2A, 2B and 2C along with FIGS. 3A, 3B and 3C.

At step S6, a torque variation like simple harmonic motion generated by the drive shaft 10 during vehicular acceleration or deceleration is detected. And sampling of the area A in FIG. 2A and area B in FIG. 3A is performed.

The torque variation control device 9 determines whether a vehicle is accelerated or decelerated based upon a first differential dNE which the first differential computation device 70 sends to the timing computation device 73 (step S100). Namely at step S100, the device 9 judges whether a rotational velocity of the drive shaft 10 increases as shown in FIG. 2A or decreases as shown in FIG. 3A with the passing of time.

If the vehicle is under acceleration, the device 9 judges whether or not the first differential dNE of rotational velocity of the drive shaft 10 is less than or equal to a predetermined value L (negative value) (FIG. 2B). If dNE is less than or equal to L (dNE≦L) (Y), the device 9 judges that the rotational velocity NE varies greatly below the reference value L and then judges whether a second differential ddNE is equal to or greater than zero (ddNE≦0) (step S102). If ddNE≦0 (Y), the device 9 judges that a torque variation like simple harmonic motion shown in FIG. 2A occurs on the drive shaft 10 and falls in the area A. Then "1" is set for a flag so that a compensation torque command RTQ can be added to a torque command with the expression (1) described before.

At steps S101 and S102 in this way, the timing of starting addition of a compensation torque command RTQ is determined for the control of motor 3.

On the other hand, if ddNE is less than zero (ddNE<0) (N) at step S102, no update is made for the flag and a previous value (0 or 1) is maintained.

If dNE is greater than L (dNE>L) (N) at step S101, the flow moves on to step S104 and the torque variation control device 9 judges whether or not the first differential dNE is equal to or greater than a predetermined value U (positive value) (dNE≧U) (FIG. 2B). If dNE≧U (Y), it indicates that a torque variation reaches towards the end of area A as shown in FIGS. 2A and 2B. At step S105 "0" is set for a flag, so that a compensation torque command RTQ computed with the expression (1) results in zero. Accordingly, no compensation is made for a torque command for the motor 3. Namely at steps S104 and S105, the timing for termination of control executed for motor 3 with a compensation torque command RTQ is determined.

On the other hand, if dNE is less than U (dNE<U) (N) at step S104, no update is made for the flag and a previous value (0 or 1) is maintained.

When a vehicle is under acceleration, "1" is set for a flag only if both dNE≦L (S101) and ddNE≧0 (S102) are satisfied. Then, a compensation torque command RTQ, which is added to a torque command, initiates the control of motor 3. Also only if dNE is equal to or greater than U (dNE≧U) at step S104, "0" is set for the flag so that a compensation torque command is not added to a torque command. In other cases than these two, no update is performed keeping a previous value (0 or 1) and thereby the previous control is continued.

If the torque variation control device 9 judges that the deceleration of a vehicle is commanded at step S100, the device 9 judges if a first differential dNE is equal to or greater than a predetermined value U' (positive value) (dNE≧U') (FIG. 3B). If dNE≧U' (Y), the device 9 judges if a second differential ddNE is less than or equal to zero (ddNE≦0) at step S107 (FIG. 3C). If ddNE≦0 is satisfied (Y) at step S107, the device 9 judges that a rotational velocity NE of the drive shaft 10 varies in simple harmonic motion and the torque variation thereof falls in the area B (FIG. 3A). Then at step S108 "1" is set for a flag so that a compensation torque command RTQ can be added to a torque command with the expression (1) described before.

On the other hand, if ddNE is greater than zero (ddNE>0) (N) at step S107, no update is made for the flag and a previous value (0 or 1) is maintained.

If dNE is less than U' (dNE<U') (N) at step S106, the flow moves on to step S109 and the torque variation control device 9 judges whether or not the first differential dNE is less than or equal to a predetermined value L' (negative value) (dNE≦L') (FIG. 3B). If dNE≦L' (Y), it indicates that a torque variation reaches towards the end of area B as shown in FIGS. 3A and 3B. At step S110 "0" is set for a flag, so that a compensation torque command RTQ computed with the expression (1) results in zero. Accordingly, no compensation is made for the torque command of motor 3. On the other hand, if dNE is greater than L' (dNE>L') (N) at step S109, a previous value (0 or 1) is maintained for the flag.

When a vehicle is under deceleration, "1" is set for a flag only if both dNE≧U' (S106) and ddNE≦0 (S107) are satisfied. Then, a negative compensation torque command RTQ, which is added to a torque command, initiates the control of motor 3. Also only if dNE≦L' is satisfied at step S109, "0" is set for the flag so that a negative compensation torque command is not added to a torque command. In other cases than these two, no update is performed for the flag keeping a previous value (0 or 1) and thereby the previous control is continued.

If the torque variation control device 9 judges that a vehicle is under neither acceleration nor deceleration, or a rotational velocity NE of the drive shaft 10 is constant, "0" is set for the flag, since control with a compensation torque command RTQ is not required.

The function of torque variation control device according to the present invention is described referring to timing charts in FIGS. 8A–8F.

Figures 8A, 8B:
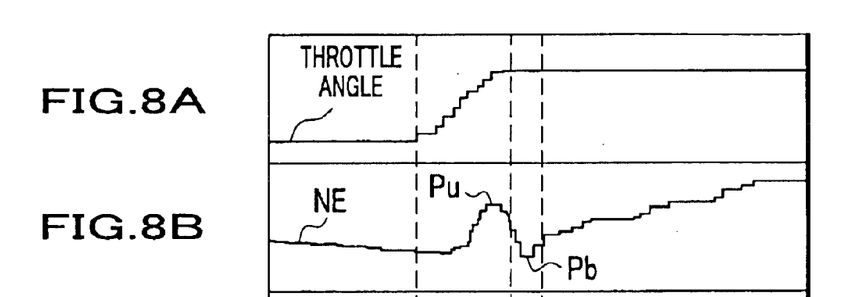
FIG. 8A to FIG. 8F are timing charts showing the operation of a torque variation control device according to the present invention.
Figure 8C:
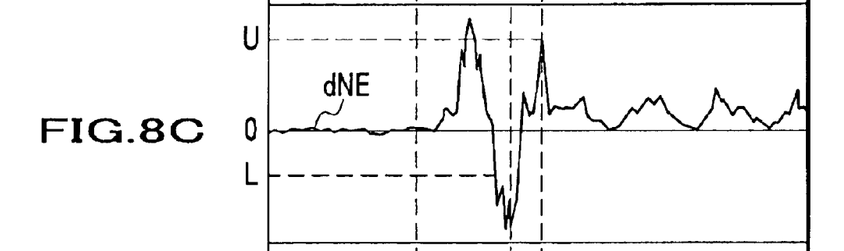
Figure 8D:
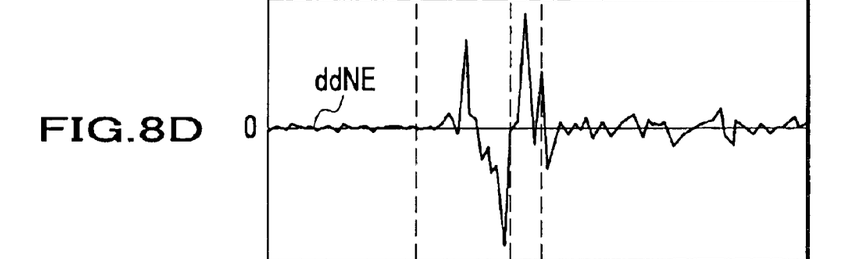
Figure 8E:
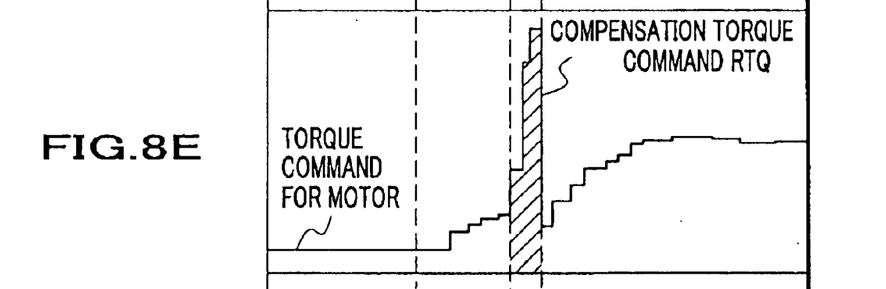
Figure 8F:
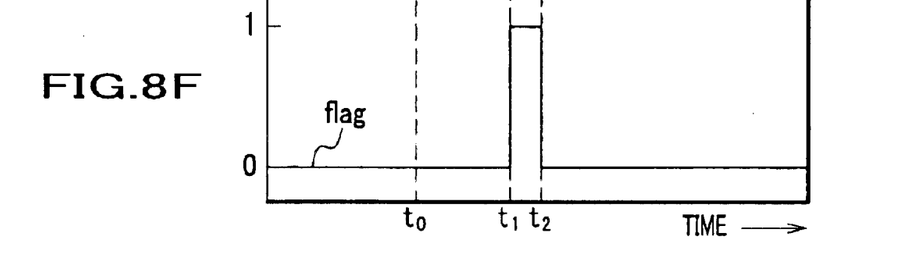

FIG. 8A is a chart showing throttle angle vs. time, FIG. 8 rotational velocity NE of drive shaft 10 vs. time, FIG. 8C first differential of NE (dNE) vs. time, FIG. 8D second differential of NE (ddNE) vs. time, FIG. 8E torque command which the adder 50 sends to the motor controller 51 (FIG. 5) to control the motor 3 vs. tune and FIG. 8F flag controlled by the timing computation device 73 vs. time.

Acceleration is started responding to opening of throttle at a time of t0 shown in FIG. 8A. The rotational velocity NE of drive shaft 10 accordingly increases experiencing vibration with maximum and minimum values Pu and Pb. The reason for this phenomenon lies in the fact that the drive shaft 10 generates a torsional vibration as a result of an interaction between the drive force exerted by the motor 3 and engine 2 and the reactive force from road surface. It is considered that areas including the maximum value Pu and minimum value Pb correspond to the relatively excessive and insufficient areas of torque for the drive shaft 10, respectively.

First and second differentials, dNE and ddNE vary responding to the variation of NE.

When a first differential dNE (FIG. 8C) falls below the predetermined value L (negative value) and a second differential ddNE (FIG. 8D) reaches equal to or greater than zero at a time of t1, "1" is set for a flag at the timing computation device 73. A positive compensation torque command RTQ is then added to a torque command so that relatively insufficient torque occurring at the minimum value Pb of rotational velocity NE can be compensated. A peak of torque command shown by batching between t1 and t2 in FIG. 8E is representative of the positive compensation torque command RTQ. In this connection, a compensation torque command RTQ is computed by multiplying a second differential ddNE by a gain K as described before.

When dNE exceeds the predetermined value U (positive value) at t2, "0" is set for the flag at the timing computation device 73 as shown in FIGS. 6 and 7, which completes addition of a compensation torque command RTQ.

It should be noted that the time t1 of starting addition of a compensation torque command RTQ and the time t2 of termination thereof are substantially synchronized with those of the concave area including the minimum value Pb. It should also be noted that the vibration of rotational velocity NE ceases at time t2 and thereafter.

As described above, in the torque variation control device according to the present invention, the torque supplied by motor 3 with appropriate amplitude and timing, which is determined based upon a compensation torque command RTQ, is exerted on the drive shaft 10 around the point of minimum value Pb of rotational velocity NE. In this way, the vibration of rotational velocity NE is efficiently restrained thereafter. This leads to an elimination or remarkable reduction of uncomfortable feeling experienced by a driver. Also this improvement can be attained without sacrificing the performance of vehicular acceleration. These features of present invention can be remarkably well demonstrated even if a vehicle has a manual transmission as exemplified in the embodiment of the present invention, which is more likely to cause uncomfortable feeling due to a torque variation.

It will now be appreciated from the foregoing description that the present invention is not limited to the particularly illustrated embodiment discussed above and may be carried out in various modified forms.

EXAMPLE

An example of the torque variation control device according to the present invention is described.

Figure 9A:
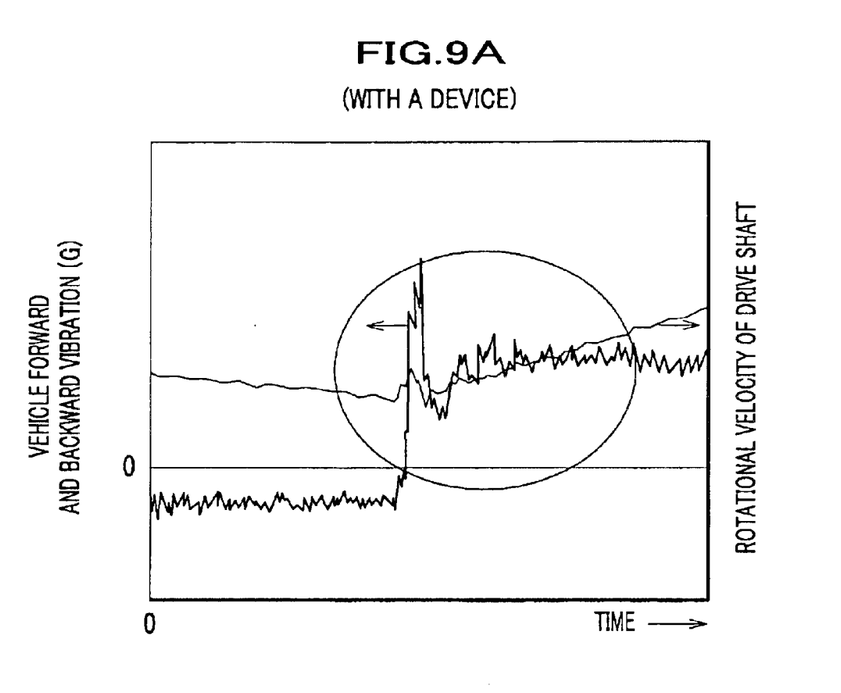
FIGS. 9A and 9B are graphs showing vibrations of vehicles with and without a torque variation control device according to the present invention, respectively.

FIG. 9A shows measured engine velocity (rotational velocity of drive shaft) and acceleration acting on a vehicle back and forth while a throttle is opened suddenly (vehicular acceleration) for a vehicle to which a torque variation control device according to the present invention is mounted.

Figure 9B:
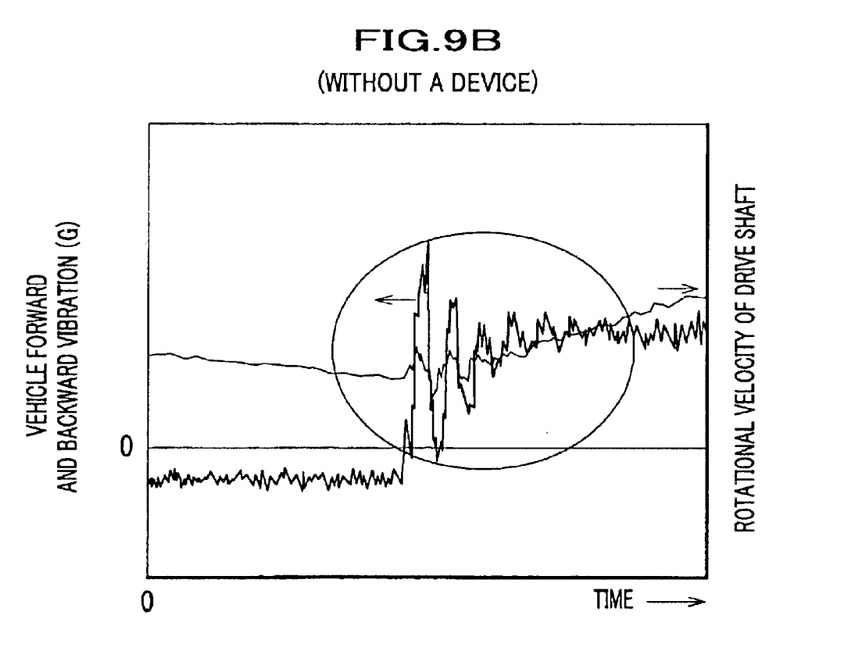

Also as an example for comparison with FIG. 9A, the same type of measured data under the same condition as that of FIG. 9A is shown in FIG. 9B for a vehicle without a torque variation control device according to the present invention.

As a result of comparison between FIG. 9A and FIG. 9B, it is observed in FIG. 9B that both the acceleration acting on a vehicle and rotational velocity of drive shaft vibrate in simple harmonic motion. On the other hand, it is observed in FIG. 9A that the vibrations of acceleration acting on a vehicle and rotational velocity of drive shaft converge right after the initiation of acceleration and thereby the rotational velocity starts increasing substantially linearly.

The torque variation control device according to the present invention allows the restriction of a torque variation like simple harmonic motion while a sudden vehicular torque variation occurs. This will remarkably benefit the performance of a vehicle.

The present invention is applicable to an electric vehicle and electric vehicle with fuel cell, to which only a motor is mounted. The present invention is also applicable to a vehicle to which a torque converter or continuously variable transmission (CVT) is mounted. In the exemplary embodiment of the present invention, a rotational velocity sensor is mounted on a motor so that rotational velocity on the drive side of a transmission is detected. However, rotational velocity on the driven side thereof may be used as an alternative signal for the control of vehicular torque variation.

What is claimed is:

1. A torque variation control device for a vehicle which has a motor providing rotational torque to a drive shaft of said vehicle, a motor control means controlling said motor based on a motor drive torque and a rotational velocity detection means detecting a rotational velocity of said drive shaft or a rotational shaft of said motor, said device comprising:

a torque variation detection means detecting a torque variation of said vehicle caused by a variation of said rotational velocity; and a compensation torque setting means setting compensation torque in an opposite phase relative to said torque variation.

2. The device according to claim 1, wherein said torque variation detection means comprises:

a first differential computation means computing a first differential of said rotational velocity; and a second differential computation means computing a second differential of said rotational velocity, wherein said torque variation detection means judges that there occurs said torque variation if said first differential is less than or equal to a first predetermined value and said second differential is equal to or greater than zero, said compensation torque setting means sets positive compensation torque and said motor control means compensates said drive torque of motor with said positive compensation torque.

3. The device according to claim 2, wherein if said drive torque of motor reaches an upper limit when said motor control means compensates said drive torque of motor with said positive compensation torque, said motor is driven based upon said upper limit of drive torque.

4. The device according to claim 2, wherein said compensation torque is determined by multiplying said second differential of multiplicand by a predetermined gain of multiplier.

5. The device according to claim 2, wherein said second differential computation means computes said second differential from said first differential which passes through a low pass filter and a resultant delay is compensated by advancing said second differential a predetermined amount.

6. The device according to claim 1, wherein said torque variation detection means comprises:

a first differential computation means computing a first differential of said rotational velocity; and a second differential computation means computing a second differential of said rotational velocity, wherein said torque variation detection means judges that there occurs said torque variation if said first differential is equal to or greater than a second predetermined value and said second differential is less than or equal to zero, said compensation torque setting means sets negative compensation torque and said motor control means compensates said drive torque of motor with said negative compensation torque.

7. The device according to claim 6, wherein if said drive torque of motor reaches an upper limit when said motor control means compensates said drive torque of motor with said negative compensation torque, said motor is driven based upon said upper limit of drive torque.

8. The device according to claim 6, wherein said compensation torque is determined by multiplying said second differential of multiplicand by a predetermined gain of multiplier.

9. The device according to claim 6, wherein said second differential computation means computes said second differential from said first differential which passes through a low pass filter and a resultant delay is compensated by advancing said second differential a predetermined amount.

10. The device according to claim 1, wherein said vehicle has an engine coupled to said drive shaft and a lag of ignition timing of said engine is increased when said torque variation is detected.

11. The device according to claim 1, wherein an upper limit of said motor drive torque is controlled based upon at least one of battery and inverter temperatures.

12. A computer program for controlling torque variation of a vehicle, which executes an onboard computer of said vehicle having a motor for generating drive power in a process comprising:

computation of a first differential in which said first differential is computed by differentiating a rotational velocity of a drive shaft of said vehicle or a rotational shaft of said motor;

computation of a second differential in which said second differential is computed by differentiating said first differential;

determination of compensation torque in which said compensation torque is determined by multiplying said second differential of multiplicand by a predetermined gain of multiplier; and determination of timing in which said timing for compensation of said drive torque of motor with said compensation torque is determined based upon at least one of said first and second differentials.

* * * * *